US010297145B2

(12) United States Patent
Thelen et al.

(10) Patent No.: US 10,297,145 B2
(45) Date of Patent: May 21, 2019

(54) METHOD AND SYSTEM FOR ESTABLISHING WHETHER A ROAD SECTION IS SUITABLE FOR AUTONOMOUS VEHICLE DRIVING

(71) Applicant: VOLVO CAR CORPORATION, Gothenburg (SE)

(72) Inventors: Sebastian Thelen, Askim (SE); Peter Harda, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 43 days.

(21) Appl. No.: 15/672,609

(22) Filed: Aug. 9, 2017

(65) Prior Publication Data

US 2018/0061226 A1 Mar. 1, 2018

(30) Foreign Application Priority Data

Aug. 30, 2016 (EP) ..................................... 16186218

(51) Int. Cl.
*G08G 1/01* (2006.01)
*G01C 21/32* (2006.01)
(Continued)

(52) U.S. Cl.
CPC ........... *G08G 1/0104* (2013.01); *G01C 21/32* (2013.01); *G05D 1/0221* (2013.01);
(Continued)

(58) Field of Classification Search
None
See application file for complete search history.

(56) References Cited

U.S. PATENT DOCUMENTS 9,170,116 B1 10/2015 Joshi et al.
9,568,915 B1 * 2/2017 Berntorp ............... B60W 30/00
(Continued)

FOREIGN PATENT DOCUMENTS

| EP | 2574958 | 4/2013 |
| EP | 2960129 | 12/2015 |
| WO | 2016090282 | 6/2016 |

OTHER PUBLICATIONS

Extended European Search Report for European Application No. EP 16186218.0, Completed by the European Patent Office, dated Mar. 8, 2017, 8 Pages.

*Primary Examiner* — Richard M Camby
(74) *Attorney, Agent, or Firm* — Brooks Kushman P.C.

(57) ABSTRACT

A suitability determining system for establishing whether a road section is suitable for at least semi-autonomous vehicle driving is described. The system identifies a road section including at least one lane and delimited by at least one lateral road boundary, and derives from at least a first estimate providing vehicle a respective utilization direction estimate along with a corresponding respective detection confidence value for each of respective lanes detected by the estimate providing vehicle along the road section. The system determines a respective summarized direction utilization estimate along with a corresponding respective summarized confidence value for each respective detected lane, and determines an autonomous driving suitability indication applicable for the road section, which indicates the road section is suitable for at least semi-autonomous driving provided all determined summarized direction utilization estimates indicate equally directed utilization and all determined summarized confidence values exceed respective confidence thresholds.

15 Claims, 3 Drawing Sheets

(51) Int. Cl.
*G05D 1/02* (2006.01)
*G06K 9/00* (2006.01)

(52) U.S. Cl.
CPC ......... *G05D 1/0278* (2013.01); *G08G 1/0112* (2013.01); *G08G 1/0141* (2013.01); *G05D 2201/0213* (2013.01); *G06K 9/00798* (2013.01); *G06T 2207/30256* (2013.01)

(56) References Cited

U.S. PATENT DOCUMENTS

| | | | |
|---|---|---|---|
| 9,690,292 B1 * | 6/2017 | Chan | G06K 9/00845 |
| 9,748,585 B2 * | 8/2017 | Adcock | H01M 8/2465 |
| 2015/0235557 A1 | 8/2015 | Engelman et al. | |

* cited by examiner

METHOD AND SYSTEM FOR ESTABLISHING WHETHER A ROAD SECTION IS SUITABLE FOR AUTONOMOUS VEHICLE DRIVING

CROSS-REFERENCE TO RELATED APPLICATIONS

This application claims foreign priority benefits under 35 U.S.C. § 119(a)-(d) to European patent application number EP 16186218.0, filed Aug. 30, 2016, which is incorporated herein by reference in its entirety.

TECHNICAL FIELD

The present disclosure relates to a suitability determining system and a method performed therein, for establishing whether a road section is suitable for at least semi-autonomous vehicle driving.

BACKGROUND

The operation of an autonomous vehicle may, at a certain stage of its technological development, be restricted to specific traffic environments. One such restriction may for instance be that autonomous operation of the vehicle only is allowed provided that the current road on which the autonomous vehicle is driving does not permit oncoming traffic. The information whether a road and/or a road section allows driving in both or only in one direction may for instance be encoded in a digital map and/or in digital map data. To fulfill safety requirements during autonomous operation, the autonomous vehicle may need to verify that information in the digital map and/or digital map data indicating that only equally directed traffic is allowed along a road section, still reflects the actual road conditions. An obvious approach for the autonomous vehicle would be to track the trajectories of surrounding vehicles during autonomous operation and hand over to the vehicle driver if it is detected that one or more vehicles are heading in an oncoming direction. A drawback with this approach is, however, that a violation of the safety criterion cannot be prevented, in that the detection is dependent upon the actual occurrence of the violation.

SUMMARY

It is therefore an object of embodiments herein to provide an approach for in an improved and/or alternative manner establish whether a road section is suitable for at least semi-autonomous vehicle driving, e.g. without having to violate said safety criterion.

According to a first embodiments herein, the object is achieved by a method performed by a suitability determining system for establishing whether a road section is suitable for at least semi-autonomous vehicle driving. The suitability determining system is associated with a system supporting communication with one or more vehicles. The suitability determining system identifies a specific road section comprising at least one lane and delimited by at least one lateral road boundary. The suitability determining system derives from at least a first estimate providing vehicle a respective utilization direction estimate along with a corresponding respective detection confidence value for each of respective lanes detected by the at least first estimate providing vehicle along at least a portion of the specific road section. The respective utilization direction estimates are based on detected driving trajectories detected by the at least first estimate providing vehicle of one or more surrounding vehicles along one or more of the respective detected lanes. The suitability determining system further determines a respective summarized direction utilization estimate along with a corresponding respective summarized confidence value for each of the respective detected lanes. Moreover, the suitability determining system determines an autonomous driving suitability indication applicable for the specific road section, which autonomous driving suitability indication indicates that the specific road section is suitable for at least semi-autonomous driving provided that all of the determined summarized direction utilization estimates indicate equally directed utilization and all of the determined summarized confidence values are above respective confidence thresholds.

Thereby, an approach is provided according to which it is established whether a road segment is adequate for at least semi-autonomous driving, e.g. without having to violate the safety criterion initially discussed. That is, since the suitability determining system is associated with a system supporting communication with one or more vehicles, said suitability determining system have the ability to communicate, for instance wirelessly, with one or more vehicles. Moreover, since a specific road section comprising at least one lane and delimited by at least one lateral road boundary is identified, a specific road section is selected from e.g. a commonly known digital map and/or digital map data. Furthermore, since there is derived from at least a first estimate providing vehicle a respective utilization direction estimate along with a corresponding respective detection confidence value for each of respective lanes detected by the at least first estimate providing vehicle along at least a portion of the specific road section, which respective utilization direction estimate is based on detected driving trajectories detected by the at least first estimate providing vehicle of one or more surrounding vehicles along one or more of the respective detected lanes, there is received—along with respective corresponding detection confidence indications—estimates from at least one vehicle of in what directions surrounding vehicles are detected to be driving in each detected lane along at least a segment of the specific road section. That is, the number of lanes of the specific road section along with in what directions surrounding vehicles have driven in said lanes, has been detected by the at least first estimate providing vehicle, and a judgement by the at least first vehicle of driving utilization for each respective lane—along with an indication of detection confidence for each lane—is subsequently provided to the suitability determining system. Moreover, since further a respective summarized direction utilization estimate along with a corresponding respective summarized confidence value for each of the respective detected lanes, is determined, there is established an aggregated judgement for each detected lane—along with a confidence indication associated therewith—of in what directions detected vehicles have been driving in each detected lane. Furthermore, since an autonomous driving suitability indication applicable for the specific road section is determined, an indicator is established reflecting appropriateness and/or eligibility of at least semi-autonomous vehicle driving along said specific road section. Accordingly, the suitability determining system may determine and further give an indication of whether or not the specific road section is deemed suitable for at least semi-autonomous driving, in being knowledgeable of how detected vehicles have driven along the specific road section, such as knowledgeable of whether detected vehicles have been driven equally directed in all detected lanes and/or whether oncoming traffic has been detected in any one of the detected lanes. Subsequently, there is provided a verification of driving utilization of the specific road section. Moreover, since the autonomous driving suitability indication indicates that the specific road section is suitable for at least semi-autonomous driving provided that all of the determined summarized direction utilization estimates indicate equally directed utilization and all of the determined summarized confidence values are above respective confidence thresholds, the autonomous driving suitability indication only indicates that the specific road section is suitable for autonomous driving in case every aggregated driving direction utilization judgement indicate the same driving direction utilization, i.e. driving in the same direction for all detected lanes, and that the confidence is high enough for all detected lanes For that reason, an approach is provided for in an improved and/or alternative manner establish whether a road section is suitable for at least semi-autonomous vehicle driving, e.g. without having to violate the safety criterion The technical features and corresponding advantages of the above mentioned method will be discussed in further detail in the following.

By introducing a method performed by a suitability determining system for establishing whether a road section is suitable for at least semi-autonomous vehicle driving, an approach is provided according to which it is established whether a road segment is adequate for at least semi-autonomous driving and/or at least partial autonomous operation, e.g. without having to violate the safety criterion initially discussed. The expression "for establishing whether a road section is suitable for at least semi-autonomous vehicle driving" may refer to "establishing whether a specific road section comprising at least one lane and delimited by at least one lateral road boundary, is suitable for at least semi-autonomous vehicle driving" and/or "for verifying whether or not a road section is deemed to allow only equally directed traffic". The road section may be of any arbitrary length of a road; additionally or alternatively, a length of the road section may be delimited by an entry onto, and/or an exit from, said road. "Suitable" may refer to "adequate", "eligible" and/or "appropriate", whereas "semi-autonomous vehicle driving" may refer to, "partially autonomous vehicle driving", "partly autonomous vehicle driving" and/or "semi-autonomous vehicle operation". Semi-autonomous vehicle driving is commonly known within the art, and may indicate a varying level of automation ranging from where the driver exercises a high degree of control over the movement of the vehicle, to an autonomous mode where the vehicle essentially drives itself, to modes that lie somewhere in between. Semi-autonomous or autonomous vehicles, the latter also commonly known as autonomously driven vehicles, driverless vehicles, self-driving vehicles, or robot vehicles, are known to sense their surrounding with techniques such as e.g. radar, lidar, GPS and/or computer vision, and advanced control systems may interpret sensory information to identify e.g. appropriate paths, as well as e.g. obstacles.

Since the suitability determining system is associated with a system supporting communication with one or more vehicles, said suitability determining system have the ability to communicate, for instance wirelessly, with one or more vehicles. The suitability determining system may be comprised in, comprise and/or be connected to the system supporting communication with one or more vehicles. Moreover, said system supporting communication with one or more vehicles, may refer to, comprise and/or be comprised in one or more servers and/or commonly known "clouds"—also referred to as "automotive clouds" and/or "automotive cloud network"—adapted or configured for storage and/or cloud-based storage and for wirelessly transmitting data to, and/or receiving data from, vehicles. The system supporting communication with one or more vehicles, and/or the one or more servers and/or clouds may further comprise, be comprised in, be associated with and/or constitute a vehicle management system adapted or configured to wirelessly communicate with vehicles, remotely control functionality of the vehicles and/or hold information associated with the vehicles; for instance a vehicle management system such as e.g. Volvo On Call Additionally or alternatively, the suitability determining system and/or subsequently the system supporting communication with one or more vehicles, may be comprised in and/or on-board a vehicle—herein referred to as an "estimate receiving vehicle". The system supporting communication with one or more vehicles may then refer to for instance a commonly known vehicle-to-vehicle and/or car-to-car communication system.

Since the suitability determining system identifies a specific road section comprising at least one lane and delimited by at least one lateral road boundary, a specific road section is selected from e.g. a commonly known and/or digital map data and/or from any arbitrary location identifier which for instance may be utilized as a reference starting point. The expression "specific" road section may refer to "upcoming", "selected" and/or "at least a first" road section. "Lane" may refer to "traffic lane" and/or "vehicle driving lane", whereas "delimited" may refer to "laterally delimited". Moreover, the expression delimited by "at least one" lateral road boundary may refer to delimited by "a respective left-hand side and right-hand side" lateral road boundary and/or delimited by "at least one outer" lateral road boundary.

Since the suitability determining system derives from at least a first estimate providing vehicle a respective utilization direction estimate along with a corresponding respective detection confidence value for each of respective lanes detected by the at least first estimate providing vehicle along at least a portion of the specific road section, which respective utilization direction estimate is based on detected driving trajectories detected by the at least first estimate providing vehicle of one or more surrounding vehicles along one or more of the respective detected lanes, there is received—along with respective corresponding detection confidence indications—estimates from at least one vehicle of in what directions surrounding vehicles are detected to be driving in each detected lane along at least a segment of the specific road section. That is, the number of lanes of the specific road section along with in what directions surrounding vehicles have driven in said lanes, has been detected by the at least first estimate providing vehicle, and a judgement by the at least first vehicle of driving utilization for each respective lane—along with an indication of detection confidence for each lane—is subsequently provided to the suitability determining system. The expression "deriving" from at least a first estimate providing vehicle may refer to "receiving" from at least a first estimate providing vehicle. Moreover, "at least a first" estimate providing vehicle may refer to "one or more" and/or "at least one first" estimate providing vehicle, whereas "estimate providing" vehicle may refer to "detecting" vehicle, "providing" vehicle and/or merely "vehicle". "Vehicle" may throughout this disclosure refer to any arbitrary vehicle, and may for instance refer to an engine-propelled vehicle, such as a car, truck, lorry, van, bus, motor cycle, scooter, tractor, military vehicle, etc.

"Vehicle" may further refer to an at least semi-autonomous vehicle discussed above. Moreover, a vehicle described herein may further be adapted or configured to determine its position, e.g. geographical position, as commonly known in the art, such as with support from a positioning system on-board the vehicle and further to provide said vehicle position to—and/or by means of—the system supporting communication with one or more vehicles discussed above, from where it subsequently may be compared to and/or mapped to digital map data and/or any other location identifier in a commonly known manner. Thus, positions of vehicles in relation to digital map data and/or location identifiers may be determined and/or derived as commonly known in the art, and subsequently, the position of the at least first estimate providing vehicle—and the optional at least first estimate receiving vehicle—in relation to the specific road section, may be determined and/or derived in a commonly known manner. The expression "a respective utilization direction estimate" may refer to "a respective driving direction utilization estimate" and/or "utilization direction estimates", and "estimate" may throughout further refer to "judgement". Moreover, the expression "a corresponding respective detection confidence value" may refer to "corresponding detection confidence values", whereas "along with" may refer to "and". Furthermore, "corresponding respective detection confidence value" may refer to "respective detection confidence value associated therewith" and/or "respective detection confidence value associated with respective utilization direction estimate". A detection confidence value may be have been determined and/or estimated as commonly known in the art, for instance taking into account detection quality and/or detection quantity such as number of surrounding vehicles in the corresponding detected lane. The expression "for each of respective lanes detected" may refer to "for every and/or all lanes detected". Moreover, "at least a portion" of the specific road section may refer to "at least a sub-section and/or segment" of the specific road section. "Based on" detected driving trajectories may refer to "based on input from", "calculated based on" and/or "derived from" detected driving trajectories. Furthermore, the expression "along one or more of the respective detected lanes" may refer to "along the detected lanes", whereas "along" one or more of the respective detected lanes may refer to "in" one or more of the respective detected lanes.

The expression "surrounding vehicles" may refer to "detectable vehicles", "vehicles detectable by the at least first estimate providing vehicle", and/or "by the at least first estimate providing vehicle detected surrounding vehicles", whereas "of one or more" surrounding vehicles may refer to "multiple" surrounding vehicles. Detection by the first estimate providing vehicle of surrounding vehicles and subsequently their driving trajectories, may have been accomplished as commonly known in the art. Said surrounding vehicles and their driving trajectories may for instance have been tracked over time and/or over a time period when the first estimate providing vehicle drove along at least a portion of the specific road section, with support from one or more known detection devices on-board the first estimate providing vehicle such as vision detection devices and/or cameras. For instance, the first estimate providing vehicle may have detected e.g. three lanes—thus a first, a second and a third lane—and further have detected driving trajectories of e.g. seven surrounding vehicles in the first lane, of e.g. four surrounding vehicles in the second lane, and of e.g. eleven surrounding vehicles in the third lane, all detected to have driving trajectories in the same direction as the first estimate providing vehicle. The first estimate providing vehicle may have been driving in any one of—or several of—the three lanes during said detection. A detection confidence value for the first lane may then have been determined and/or estimated by the first estimate providing vehicle to be e.g. "4" on a an exemplifying scale from 0-10, a detection confidence value for the second lane determined to be e.g. "2" and a detection confidence value for the third lane determined to be e.g. "5". Correspondingly, a second estimate providing vehicle for instance traveling in the same direction as the first estimate providing vehicle, may similarly have detected three lanes and further have detected driving trajectories of e.g. thirty surrounding vehicles in the first lane, of e.g. twenty surrounding vehicles in the second lane, and of e.g. ten surrounding vehicles in the third lane, all detected to have driving trajectories in the same direction as the second estimate providing vehicle. A detection confidence value for the first lane may then have been determined and/or estimated by the second estimate providing vehicle to be e.g. "9", a detection confidence value for the second lane determined to be e.g. "7" and a detection confidence value for the third lane determined to be e.g. "5". The suitability determining system would in this exemplifying scenario then derive from the first estimate providing vehicle:

a first lane utilization direction which indicates a direction coinciding with a travel direction of the first estimate providing vehicle, along with a first lane detection confidence value which indicates "4", a second lane utilization direction which indicates a direction coinciding with a travel direction of the first estimate providing vehicle, along with a second lane detection confidence value which indicates "2", and a third lane utilization direction which indicates a direction coinciding with a travel direction of the first estimate providing vehicle, along with a third lane detection confidence value which indicates "5".

Correspondingly, the suitability determining system would in this exemplifying scenario additionally derive from the second estimate providing vehicle:

a first lane utilization direction which indicates a direction coinciding with a travel direction of the second estimate providing vehicle, along with a first lane detection confidence value which indicates "9", a second lane utilization direction which indicates a direction coinciding with a travel direction of the second estimate providing vehicle, along with a second lane detection confidence value associated with the second lane which indicates "7", and a third lane utilization direction which indicates a direction coinciding with a travel direction of the second estimate providing vehicle, along with a third lane detection confidence value which indicates "5".

Detection by the first estimate providing vehicle of respective lanes, may have been accomplished in any arbitrary manner. The number of lanes and potentially their dispositions may for instance have been determined and/or estimated with one or a combination of the following approaches:

Lane markers of the specific road section may have been detected by the at least first estimate providing vehicle. e.g. with support from one or more commonly known sensors e.g. vision based sensors such as cameras, thus offering in combination with tracking of observed lane markers over time, an estimate for the number of lanes. A confidence in this estimate may have been based on quality and/or continuity of lane markers and/or distance between adjacent lane markers and their trajectories over time.

The distance between road boundaries of the specific road section may have been combined with an assumption of the expected width of a lane, thus providing—in the absence of lane markers—a rough estimate on the number of lanes. Given lane markings, this distance may have been used to validate the estimated number of lanes and as such influenced the confidence in the estimate. Road boundaries may have been detected with different sensors, such as for instance radar, lidar and/or vision based sensors.

Trajectories of surrounding vehicles may have been tracked over time while driving along the specific road section. With commonly known clustering or trace merge techniques, pieces of trajectories with identical direction that lie close together may have been merged and outliers, e.g. from lane changes, may have been detected and removed. The pieces of possibly merged trajectories may then have been approximated by e.g. a low order polynomial in a known manner to get a compressed and simplified representation. The number of adjacent simplified trajectories and their lateral spacing is an indicator for the number of lanes at the specific road section. A confidence for an estimated lane count may have depended on the number of observed individual vehicle trajectories for said section.

Since the suitability determining system further determines a respective summarized direction utilization estimate along with a corresponding respective summarized confidence value for each of the respective detected lanes, there is established an aggregated judgement for each detected lane—along with a confidence indication associated therewith—of in what directions detected vehicles have been driving in each detected lane. The summarized direction utilization estimate for a detected lane is accordingly determined taking into account the utilization direction estimates for said lane—and potentially additionally corresponding detection confidence values—received from the one or more estimate providing vehicles. Correspondingly, the summarized confidence value for said detected lane is accordingly calculated, estimated and/or derived taking into account the detection confidence values for said lane received from the one or more estimate providing vehicles. The different utilization direction estimates and/or detection confidence values may be weighted as commonly known in the art. Thus, in the exemplifying scenario discussed above, according to which the suitability determining system derived from the first estimate providing vehicle a first lane utilization direction which indicated a direction coinciding with a travel direction of the first estimate providing vehicle, along with a first lane detection confidence value which indicated "4", and from the second estimate providing vehicle a first lane utilization direction which indicated a direction coinciding with a travel direction of the second estimate providing vehicle—which coincided with the travel direction of the first estimate providing vehicle—along with a first lane detection confidence value which indicated "9", the suitability determining system may determine the summarized direction utilization estimate for the first detected lane to be represented by a direction indication equally directed to a driving direction of the first estimate providing vehicle and further determine the summarized confidence value to be represented by exemplifying "7"—derived from "4" and "9". In a similar manner, the suitability determining system may determine the summarized direction utilization estimate for the second detected lane to be represented by a direction indication equally directed to a driving direction of the first estimate providing vehicle and further determine the summarized confidence value to be represented by exemplifying "5"—derived from "2" and "7", and further determine the summarized direction utilization estimate for the third detected lane to be represented by a direction indication equally directed to a driving direction of the first estimate providing vehicle and further determine the summarized confidence value to be represented by exemplifying "5"—derived from "5" and "5". Optionally, an aggregation of two observations may for instance follow Bayesian statistics and a reinforcement learning approach, where the observations from the second estimate providing vehicle—that in this case confirms the first observation of the first estimate providing vehicle—would create a summary confidence that is higher than or equal to the highest individual confidence; e.g. "4" and "9" as for the first detected lane would lead to the summary confidence value "9" or "10". The same principal may correspondingly apply for the summary confidence values of the second and third detected lanes.

According to an alternative example, should utilization direction estimates be provided merely by the first estimate providing vehicle and no further estimate providing vehicle(s), then the respective summarized direction utilization estimate for each of the respective detected lanes, may respectively be constituted of the respective utilization direction estimate derived from the first estimate providing vehicle. Correspondingly, the corresponding respective summarized confidence value for each of the respective detected lanes, may then respectively be constituted of the respective detection confidence value derived from the first estimate providing vehicle. Accordingly, the suitability determining system may in this latter scenario determine the summarized direction utilization estimate for the first detected lane to be represented by a direction indication equally directed to a driving direction of the first estimate providing vehicle as indicated by the utilization direction estimate for the first lane received merely from the first estimate providing vehicle, and further determine the summarized confidence value to be represented by exemplifying "4" which equals the detection confidence value for the first lane received merely from the first estimate providing vehicle. Correspondingly, the suitability determining system may in this latter scenario determine the summarized direction utilization estimate for the second detected lane to be represented by a direction indication equally directed to a driving direction of the first estimate providing vehicle as indicated by the utilization direction estimate for the second lane received merely from the first estimate providing vehicle, and further determine the summarized confidence value to be represented by exemplifying "2" which equals the detection confidence value for the second lane received merely from the first estimate providing vehicle. Moreover, correspondingly, the suitability determining system may in this latter scenario determine the summarized direction utilization estimate for the third detected lane to be represented by a direction indication equally directed to a driving direction of the first estimate providing vehicle as indicated by the utilization direction estimate for the third lane received merely from the first estimate providing vehicle, and further determine the summarized confidence value to be represented by exemplifying "5" which equals the detection confidence value for the third lane received merely from the first estimate providing vehicle.

The expression "determining" a respective summarized direction utilization estimate along with a corresponding respective summarized confidence value, may refer to "deriving", "selecting" and/or "calculating" a respective summarized direction utilization estimate along with a corresponding respective summarized confidence value. Moreover, the expression "summarized direction utilization estimate" may refer to "aggregated direction utilization estimate", "summarized driving direction utilization estimate" and/or "summarized lane estimate". "Summarized confidence value" may refer to "summarized lane confidence value". "A corresponding" respective summarized confidence value may refer to "an associated" respective summarized confidence value. Moreover, "a respective summarized direction utilization estimate along with a corresponding respective summarized confidence value" may refer to "a respective summarized direction utilization estimate and a corresponding respective summarized confidence value" and/or "summarized direction utilization estimates and corresponding summarized confidence values". Furthermore, the expression "for each of the respective detected lanes" may refer to "for every detected lane", "for all detected lanes" and/or "for each of the respective detected lanes detected by the at least first estimate providing vehicle". Additionally or alternatively, the expression "for each of the respective detected lanes" may refer to "for each of the respective detected lanes, based on the respective utilization direction estimates along with the respective detection confidence values for each of the respective detected lanes derived at least from the at least first estimate providing vehicle" and/or "for each of the respective detected lanes, based on said respective utilization direction estimates and said respective detection confidence values".

Since the suitability determining system determines an autonomous driving suitability indication applicable for the specific road section, an indicator is established reflecting appropriateness and/or eligibility of at least semi-autonomous vehicle driving along said specific road section. Accordingly, the suitability determining system may determine and further give an indication of whether or not the specific road section is deemed suitable for at least semi-autonomous driving, in being knowledgeable of how detected vehicles have driven along the specific road section, such as knowledgeable of whether detected vehicles have been driven equally directed in all detected lanes and/or whether oncoming traffic has been detected in any one of the detected lanes. Subsequently, there is provided a verification of driving utilization of the specific road section. The expression "determining" an autonomous driving suitability indication may refer to "deriving" and/or "estimating" an autonomous driving suitability indication. Additionally or alternatively, "determining" may in this context refer to "determining, based on the summarized direction utilization estimates and the corresponding summarized confidence values, ". Furthermore, "autonomous driving suitability indication" may refer to "autonomous driving eligibility indication", whereas "indication" may refer to "indicator", "recommendation", "preference" and/or "verification". The expression "applicable for" the specific road section may refer to "valid for" and/or "pertinent" the specific road section Moreover, since the autonomous driving suitability indication indicates that the specific road section is suitable for at least semi-autonomous driving provided that all of the determined summarized direction utilization estimates indicate equally directed utilization and all of the determined summarized confidence values are above respective confidence thresholds, the autonomous driving suitability indication only indicates that the specific road section is suitable for autonomous driving in case every aggregated driving direction utilization judgement indicate the same driving direction utilization, i.e. driving in the same direction for all detected lanes, and that the confidence is high enough for all detected lanes. Thus, in the exemplifying scenario discussed above—according to which the summarized direction utilization estimates for all three respective detected lanes were determined to be equally directed to a driving direction of the first estimate providing vehicle, and according to which it was further determined that the summarized confidence value for the first lane was "7", the summarized confidence value for the second lane was "5" and the summarized confidence value for the third lane was "5"—should a respective confidence threshold for each detected lane be set to exemplifying "5", then the autonomous driving suitability indication would indicate that the specific road section is suitable for at least semi-autonomous driving, since all of the determined summarized direction utilization estimates indicate equally directed utilization and all of the determined summarized confidence values "7", "5" and "5" are above respective confidence thresholds "5". The autonomous driving suitability indication may when indicating that the specific road section is suitable for at least semi-autonomous driving for instance be represented by and/or comprise an attribute, such as "1", "yes", "verified equally directed" and/or "above thresholds", etc. Moreover, "indicates" may for instance refer to "reflects" and/or "comprises information indicating". Furthermore, the expression "provided that" may refer to "in case", "if" and/or "when", whereas "all of" may refer to "each" and/or "everyone". The expression "equally directed utilization" may refer to "equally directed driving utilization" and/or "equally directed utilization by the detected surrounding vehicles". "Above" respective confidence thresholds may refer to "equal to and/or exceeds" respective confidence thresholds, whereas "confidence thresholds" may refer to "predetermined confidence thresholds", "minimum confidence thresholds" and/or "confidence limits". A confidence threshold may be set to any arbitrarily selected value, for instance ranging from 1-10, and may for instance be set differently from one detected lane to another. Additionally or alternatively, a confidence threshold may be equally set for all detected lanes.

Optionally, the autonomous driving suitability indication may further indicate that the specific road section is unsuitable for at least semi-autonomous driving when not all of the determined summarized direction utilization estimates indicate equally directed utilization. Thereby, should not the summarized direction utilization estimates for all detected lanes be determined to be equally directed, i.e. oncoming traffic may have been detected, then the autonomous driving suitability indication would indicate that the specific road section is unsuitable for at least semi-autonomous driving, regardless of whether the determined summarized confidence values are above respective confidence thresholds or not. The autonomous driving suitability indication may when indicating that the specific road section is unsuitable for at least semi-autonomous driving throughout this disclosure for instance be represented by and/or comprise an attribute, such as "0", "no", "verified non-equally directed" and/or "below threshold(s)", etc.

Optionally, the autonomous driving suitability indication may further indicate that the specific road section is unsuitable for at least semi-autonomous driving when not all of the determined summarized confidence values are above the respective confidence thresholds. Thereby, should a confidence level for a detected lane not be reached, for instance due to unsatisfying detection quality and/or quantity by the at least first estimate providing vehicle, then the autonomous driving suitability indication would indicate that the specific road section is unsuitable for at least semi-autonomous driving, regardless of whether all detected lanes have been determined to be equally directed or not. Thus, in the exemplifying scenario discussed above—according to which the summarized direction utilization estimates for all respective detected lanes were determined to be equally directed to a driving direction of the first estimate providing vehicle, and further determined the summarized confidence value for the first lane to the value "7", the second lane to the value "5" and the third lane to the value "5", should a respective confidence threshold for each detected lane be set to exemplifying "7", then the autonomous driving suitability indication would indicate that the specific road section is unsuitable for at least semi-autonomous driving, since—although all of the determined summarized direction utilization estimates indicate equally directed utilization—not all of the determined summarized confidence values "7", "5" and "5" are above respective confidence thresholds "7".

According to an example, optionally, the autonomous driving suitability indication further indicates that the specific road section is unsuitable for at least semi-autonomous driving when:

a derived number of detected lanes detected by at least one of said at least first estimate providing vehicle, differs from a derived number of detected lanes detected by at least another of said at least first estimate providing vehicle.

Thereby, should a different number of lanes have been detected from one estimate providing vehicle to another, then the specific road section may be deemed unsuitable for autonomous driving, in that there is uncertainty regarding how many lanes the specific road section actually comprise and subsequently uncertainty regarding driving direction utilization for the lanes.

Optionally, the suitability determining system may further provide the autonomous driving suitability indication to at least a first estimate receiving—at least semi-autonomous—vehicle approaching and/or driving along the specific road section. Thereby, one or more vehicles supporting autonomous operation may be informed of whether or not the specific road section is deemed suitable for at least semi-autonomous vehicle driving. That is, said one or more estimate receiving vehicles are thus provided a driving utilization verification of the specific road section, indicating whether or not the specific road section is deemed a road section comprising equally directed traffic in all lanes—e.g. one-way traffic—or if one or more lanes are deemed comprising oncoming traffic—e.g. two-way traffic. Thus, with the introduced concept, the one or more estimate receiving vehicles may not need to violate the safety criterion initially discussed. "Providing" the autonomous driving suitability indication, may refer to "sending" and/or "pushing" the autonomous driving suitability indication, and may be accomplished as commonly known in the art. Moreover, "at least a first" estimate receiving vehicle may refer to "one or more" and/or "at least one first" estimate receiving vehicle, whereas, "estimate receiving vehicle" may refer simply to "receiving vehicle" and/or "vehicle".

Additionally or alternatively, optionally, should the suitability determining system be implemented locally on-board a vehicle—such as on-board the first estimate receiving vehicle—rather than remotely in e.g. an automotive cloud, then an activation/deactivation unit of the suitability determining system may further be adapted or configured for and/or a method of the suitability determining system may further comprise:

upon entering and/or driving along said specific road section:

activating at least semi-autonomous vehicle driving, provided that said autonomous driving suitability indication indicates that said specific road section is suitable for at least semi-autonomous driving; and/or deactivating an ongoing at least semi-autonomous vehicle driving, provided that said autonomous driving suitability indication indicates that said specific road section is unsuitable for at least semi-autonomous driving.

Thereby, the at least first estimate receiving vehicle may adapt autonomous operation to the content of the autonomous driving suitability indication.

Optionally, the suitability determining system may further update, in digital map data, information associated with the specific road section and/or a lane thereof with the autonomous driving suitability indication and/or with at least one of the respective summarized direction utilization estimates and/or one or more of the corresponding respective summarized confidence values. Thereby, data content in the digital map data relating to the specific road section and/or a lane thereof may be updated—e.g. continuously or intermittently—with up-to-date information derived from the one or more estimate providing vehicles.

Optionally, the specific road section is represented by a specific road section along a road intended for one-way traffic. Thereby, the specific road section may optionally refer to a road section along for instance a freeway and/or a highway. Additionally or alternatively, optionally, the at least one lateral road boundary may be represented by at least one delimiter physically delimiting the specific road section. Thereby, the delimiter physically delimiting the specific road section may optionally be represented by for instance a barrier. The expression "delimiting the specific road section" may refer to "delimiting the specific road section from one or more roads intended for traffic in an opposite travel direction"

Optionally, the respective direction utilization estimate may indicate a driving direction of the detected driving trajectories in view of a driving direction of the at least first vehicle: equally directed, directed in an oncoming direction, and/or both equally directed to and in an oncoming direction. Thereby, in being aware of the driving direction of the at least first estimate providing vehicle, the driving direction of detected driving trajectories may be derived and/or determined.

According to a second embodiments herein, the object is achieved by a suitability determining system adapted or configured for establishing whether a road section is suitable for at least semi-autonomous vehicle driving. The suitability determining system is associated with a system supporting communication with one or more vehicles. The suitability determining system comprises a road section identifying unit adapted or configured for identifying a specific road section comprising at least one lane and delimited by at least one lateral road boundary. The suitability determining system further comprises a deriving unit adapted or configured for deriving from at least a first estimate providing vehicle a respective utilization direction estimate along with a corresponding respective detection confidence value for each of respective lanes detected by the at least first estimate providing vehicle along at least a portion of the specific road section. The respective utilization direction estimate is based on detected driving trajectories detected by the at least first estimate providing vehicle of one or more surrounding vehicles along one or more of the respective detected lanes. The suitability determining system moreover comprises a summary determining unit adapted or configured for determining a respective summarized direction utilization estimate along with a corresponding respective summarized confidence value for each of the respective detected lanes.

Furthermore, the suitability determining system comprises a suitability determining unit adapted or configured for determining an autonomous driving suitability indication applicable for the specific road section, which autonomous driving suitability indication indicates that the specific road section is suitable for at least semi-autonomous driving provided that all of the determined summarized direction utilization estimates indicate equally directed utilization, and all of the determined summarized confidence values are above respective confidence thresholds.

Optionally, the autonomous driving suitability indication may further indicate that the specific road section is unsuitable for at least semi-autonomous driving when not all of the determined summarized direction utilization estimates indicate equally directed utilization.

Furthermore, optionally, the autonomous driving suitability indication may further indicate that the specific road section is unsuitable for at least semi-autonomous driving when not all of the determined summarized confidence values are above the respective confidence thresholds.

Optionally, the suitability determining system may further comprise a providing unit adapted or configured for providing the autonomous driving suitability indication to at least a first estimate receiving—at least semi-autonomous—vehicle approaching and/or driving along the specific road section.

Furthermore, optionally, the suitability determining system may further comprise an updating unit adapted or configured for updating, in digital map data, information associated with the specific road section and/or a lane thereof with the autonomous driving suitability indication, and/or with at least one of the respective summarized direction utilization estimates and/or one or more of the corresponding respective summarized confidence values.

Optionally, the specific road section may be represented by a specific road section along a road intended for one-way traffic. Additionally or alternatively, optionally, the at least one lateral road boundary may be represented by at least one delimiter physically delimiting the specific road section Moreover, optionally, the respective direction utilization estimate may indicate a driving direction of the detected driving trajectories in view of a driving direction of the at least first estimate providing vehicle: equally directed, directed in an oncoming direction, and/or both equally directed and in an oncoming direction.

Similar advantages as those mentioned in the foregoing in relation to the first embodiment correspondingly apply to the second, which is why these advantages are not further discussed.

According to a third embodiments herein, the object is achieved by a computer program product comprising a computer program containing computer program code means arranged to cause a computer or a processor to execute the steps of the suitability determining system discussed above, stored on a computer-readable medium or a carrier wave. Again, similar advantages as those mentioned in the foregoing in relation to the first embodiment correspondingly apply to the third, which is why these advantages are not further discussed.

BRIEF DESCRIPTION OF THE DRAWINGS

The various non-limiting embodiments of the disclosure, including particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to establishing whether a road section is suitable for at least semi-autonomous vehicle driving, there will be disclosed an approach according to which it is established whether a road segment is adequate for at least semi-autonomous driving, e.g. without having to violate the safety criterion initially discussed.

Figure 1:
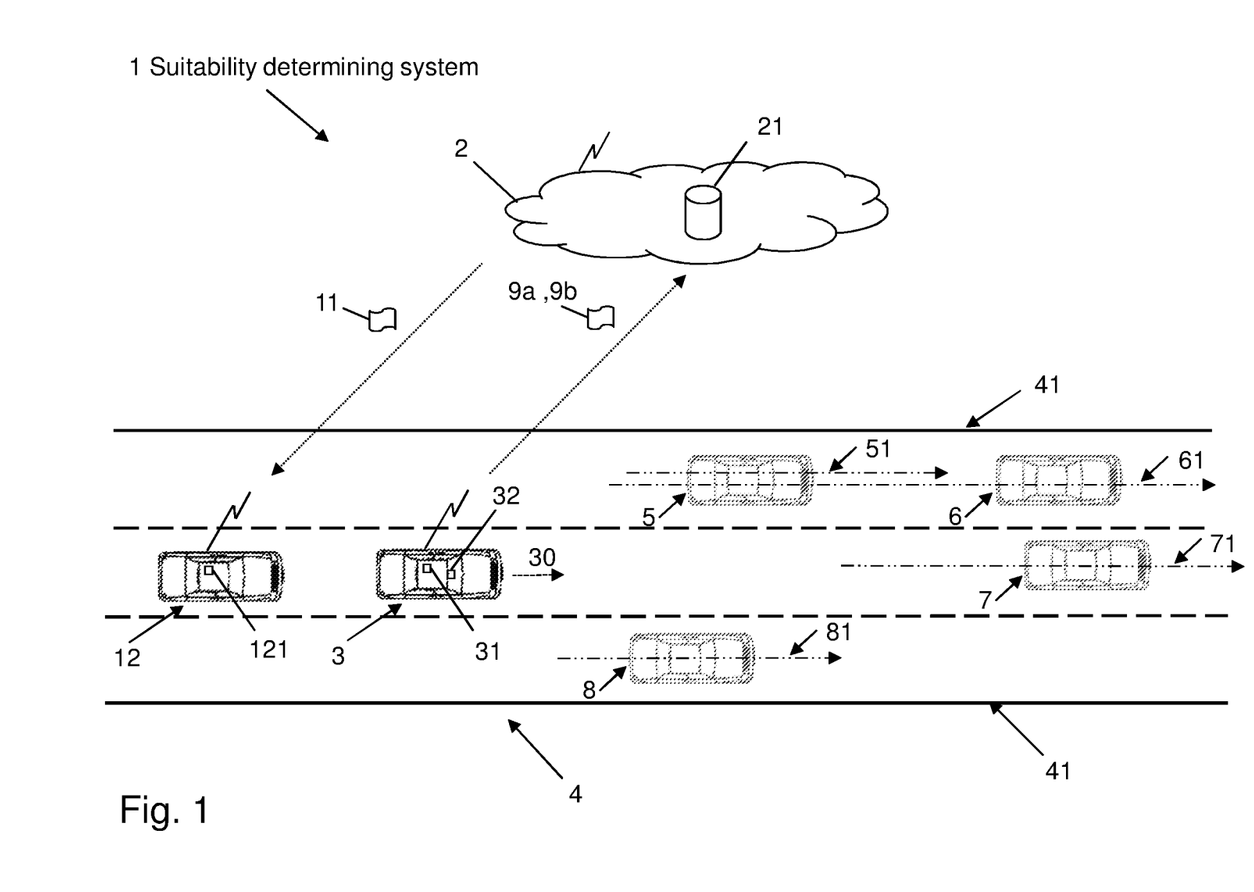
FIG. 1 illustrates a schematic overview of an exemplifying suitability determining system according to embodiments of the disclosure.

Referring now to the figures and FIG. 1 in particular, there is illustrated a schematic overview of an exemplifying suitability determining system 1 according to embodiments of the disclosure. The suitability determining system 1 is associated with—for instance at least partly comprised in—a commonly known system 2 supporting communication with one or more vehicles. The system 2 supporting communication with one or more vehicles—and subsequently the suitability determining system 1—is here comprised in one or more servers and/or automotive clouds. Further depicted is optional digital map data 21, e.g. comprised in a digital map database of said system 2 supporting communication with one or more vehicles.

An at least first estimate providing vehicle 3 drives in a driving direction 30 along a specific road section 4 of a three-lane freeway, which specific road section 4 comprises at least one lane—here three—and is further delimited by at least one lateral road boundary 41. The specific road section 4 may, as shown, be represented by a specific road section 4 along a road intended for one-way traffic. Moreover, the at least one lateral road boundary 41 may be represented by at least one delimiter physically delimiting the specific road section 4. The first estimate providing vehicle 3 here comprises an optional known positioning system 31, for vehicle positioning, and further one or more commonly known optional detection devices 32 such as cameras, for detection of lanes along at least a portion of the specific road section 4 and further for detection of one or more surrounding vehicles 5, 6, 7, 8; here exemplifying four surrounding vehicles. Also shown in FIG. 1 is detected driving trajectories 51, 61, 71, 81 of the surrounding vehicles 5, 6, 7, 8, detected by the first estimate providing vehicle 3.

Further depicted is utilization direction estimates 9*a* along with corresponding detection confidence values 9*b* derived by the suitability determining system 1 from the at least first estimate providing vehicle 3. The utilization direction estimates 9*a* and the corresponding detection confidence values 9*b* will be described in further detail in conjunction with FIG. 3.

Further shown in FIG. 1 is an autonomous driving suitability indication 11 provided from the suitability determining system 1 to an optional at least a first estimate receiving—at least semi-autonomous—vehicle 12 approaching and/or driving along the specific road section 4. The first estimate receiving vehicle 12 may comprise or have on-board an optional known positioning system 121, for positioning thereof. The autonomous driving suitability indication 11 will be described in further detail in conjunction with FIG. 3 below.

Figure 2:
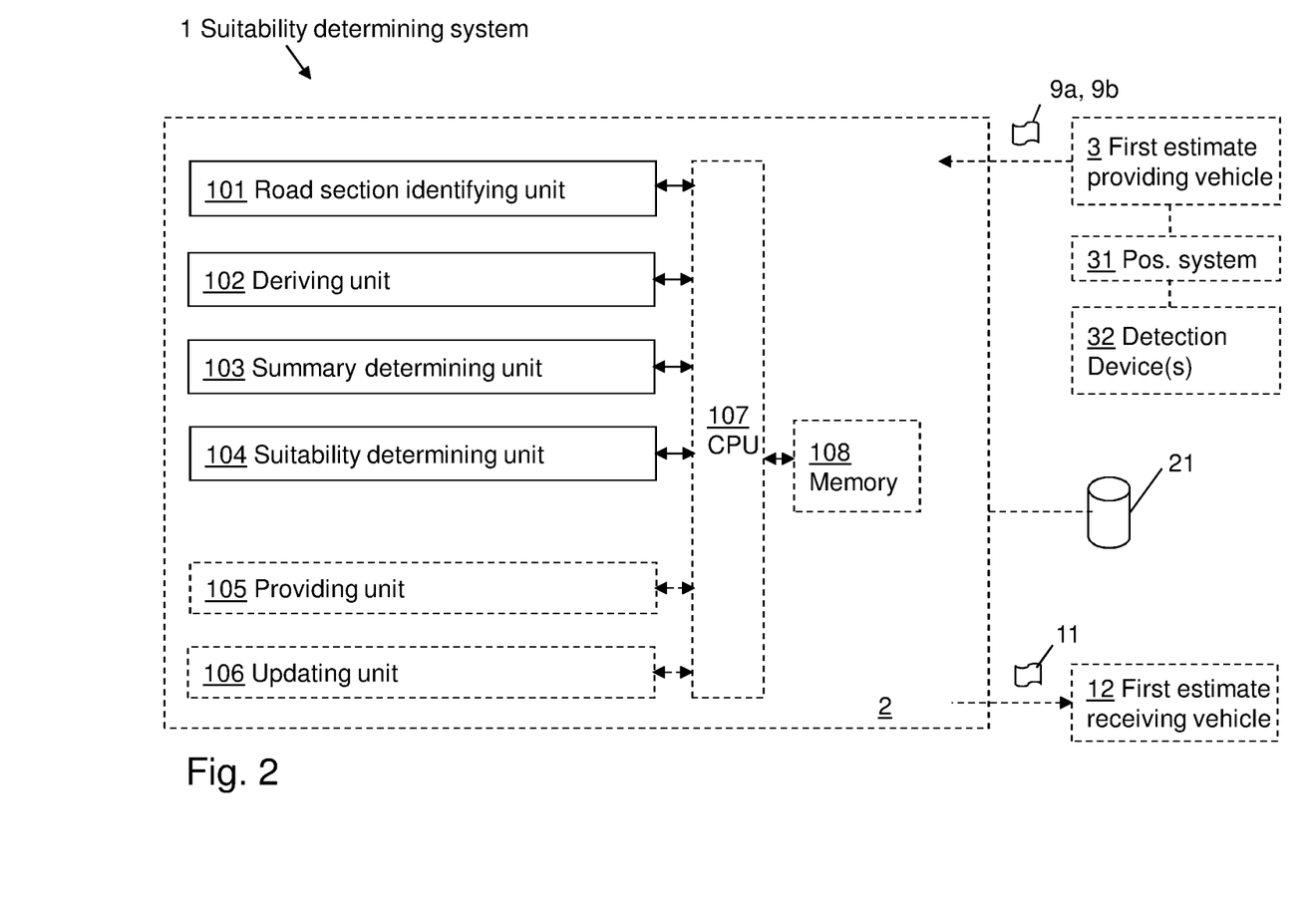
FIG. 2 is a schematic block diagram illustrating an exemplifying suitability determining system according to embodiments of the disclosure.
Figure 3:
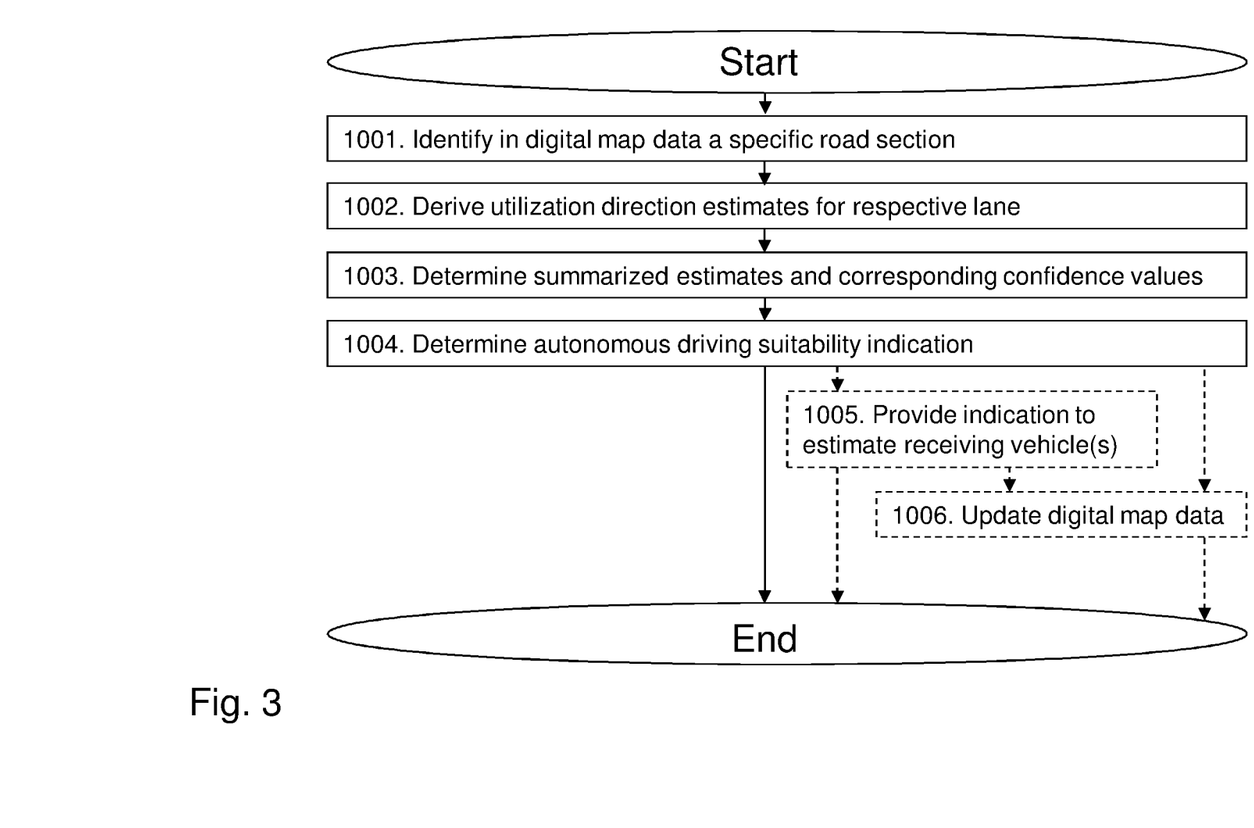
FIG. 3 is a flowchart depicting an exemplifying method for establishing whether a road section is suitable for at least semi-autonomous vehicle driving, according to embodiments of the disclosure.

As further shown in FIG. 2, which depicts a schematic block diagram illustrating an exemplifying suitability determining system 1 according to embodiments of the disclosure, the suitability determining system comprises a road section identifying unit 101, a deriving unit 102, a summary determining unit 103 and a suitability determining unit 104, all of which be described in greater detail in conjunction with FIG. 3. The suitability determining system 1 may further comprise an optional providing unit 105 and/or an optional updating unit 106, which in a similar manner will be described in greater detail in conjunction with FIG. 3. Furthermore, the embodiments herein for establishing whether a road section is suitable for at least semi-autonomous vehicle driving may be implemented through one or more processors, such as a processor 107, here denoted CPU, together with computer program code for performing the functions and actions of the embodiments herein. Said program code may also be provided as a computer program product, for instance in the form of a data carrier carrying computer program code for performing the embodiments herein when being loaded into the suitability determining system 1. One such carrier may be in the form of a CD ROM disc. It is however feasible with other data carriers such as a memory stick. The computer program code may furthermore be provided as pure program code on a server and downloaded to the suitability determining system 1.

The suitability determining system 1 may further comprise a memory 108 comprising one or more memory units. The memory 108 may be arranged to be used to store e.g. information, and further to store data, configurations, schedulings, and applications, to perform the methods herein when being executed in the suitability determining system 1. Furthermore, the road section identifying unit 101, the deriving unit 102, the summary determining unit 103, the suitability determining unit 104, the optional providing unit 105, the optional updating unit 106, the optional processor 107 and/or the optional memory 108 may for instance at least partly be implemented in the system 2 supporting communication with one or more vehicles. The system 2 supporting communication with one or more vehicles, may refer to, comprise and/or be comprised in one or more servers and/or clouds—adapted or configured for storage and/or cloud-based storage and for wirelessly transmitting data to, and/or receiving data from, vehicles. The system 2 supporting communication with one or more vehicles, and/or the one or more servers and/or clouds may further comprise, be comprised in, be associated with and/or constitute a vehicle management system adapted or configured to wirelessly communicate with vehicles, remotely control functionality of the vehicles and/or hold information associated with the vehicles; for instance a vehicle management system such as e.g. Volvo On Call. Additionally or alternatively, the suitability determining system 1 and subsequently the system 2 supporting communication with one or more vehicles, may—rather than being implemented remotely—be implemented locally on-board a vehicle, such as on-board the at least first estimate receiving vehicle 12. Those skilled in the art will also appreciate that the road section identifying unit 101, the deriving unit 102, the summary determining unit 103, the suitability determining unit 104, the optional providing unit 105 and/or the optional updating unit 106, described above, and which will be described in more detail later on in this description, may refer to a combination of analog and digital circuits, and/or one or more processors configured with software and/or firmware, e.g. stored in a memory such as the memory 108, that when executed by the one or more processors such as the processor 107 perform as will be described in more detail in conjunction with FIG. 3. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

FIG. 3 is a flowchart depicting an exemplifying method for establishing whether a road section is suitable for at least semi-autonomous vehicle driving, according to embodiments of the disclosure. The method is performed by the suitability determining system 1, which—as previously discussed—is associated with a system 2 supporting communication with one or more vehicles. The exemplifying method, which may be continuously repeated, comprises the following actions discussed with support from FIGS. 1 and 2. The actions may be taken in any suitable order, for instance may Action 1001 and Action 1002 be performed simultaneously and/or in an alternate order. In a similar manner may optional Action 1005 and optional Action 1006 be performed simultaneously and/or in an alternate order.

Action 1001

In Action 1001, the suitability determining system 1 identifies—e.g. in digital map data 21—a specific road section 4 comprising at least one lane and delimited by at least one lateral road boundary 41. Correspondingly, the road section identifying unit 101 is adapted or configured for identifying—e.g. in digital map data 21—a specific road section 4 comprising at least one lane and delimited by at least one lateral road boundary 41. Thus, as shown with support from FIGS. 1 and 2, a specific road section 41—or a "mapped" specific road section—may be selected from e.g. a commonly known digital map and/or digital map data 21.

Action 1002

In Action 1002, the suitability determining system 1 derives from at least a first estimate providing vehicle 3 a respective utilization direction estimate 9*a* along with a corresponding respective detection confidence value 9*b* for each of respective lanes detected by the at least first estimate providing vehicle 3 along at least a portion of the specific road section 4. Correspondingly, the deriving unit 102 is adapted or configured for deriving from at least a first estimate providing vehicle 3 a respective utilization direction estimate 9*a* along with a corresponding respective detection confidence value 9*b* for each of respective lanes detected by the at least first estimate providing vehicle 3 along at least a portion of the specific road section 4. The respective utilization direction estimates 9*a* are based on detected driving trajectories 51, 61, 71, 81 detected by the at least first estimate providing vehicle 3 of one or more surrounding vehicles 5, 6, 7, 8 along one or more of the respective detected lanes. Thus, as shown with support from FIGS. 1 and 2, there is received—along with respective corresponding detection confidence indications 9*b*—estimates 9*a* from at least one vehicle 3 of in what directions 51, 61, 71, 81 surrounding vehicles 5, 6, 7, 8 are detected to be driving in each detected lane along at least a segment of the specific road section 4. That is, the number of lanes of the specific road section 4 along with in what directions 51, 61, 71, 81 surrounding vehicles 5, 6, 7, 8 have driven in said lanes, has been detected by the at least first estimate providing vehicle 3, and a judgement 9*a* by the at least first vehicle 3 of driving utilization for each respective lane—along with an indication 9*b* of detection confidence for each lane—is subsequently provided to the suitability determining system 1.

Optionally, the respective direction utilization estimate 9*a* indicates a driving direction of the detected driving trajectories 51, 61, 71, 81 in view of a driving direction 30 of the at least first estimate providing vehicle 3: equally directed, directed in an oncoming direction, and/or both equally directed and in an oncoming direction. Thus, as shown with support from FIG. 1, in being aware of the driving direction 30 of the at least first estimate providing vehicle 3, the driving direction of detected driving trajectories 51, 61, 71, 81 may be derived and/or determined.

Action 1003

In Action 1003, the suitability determining system 1 determines a respective summarized direction utilization estimate along with a corresponding respective summarized confidence value for each of the respective detected lanes. Correspondingly, the summary determining unit 101 is adapted or configured for determining a respective summarized direction utilization estimate along with a corresponding respective summarized confidence value for each of the respective detected lanes. Thus, as shown with support from FIGS. 1 and 2, there is established an aggregated judgement for each detected lane—along with a confidence indication associated therewith—of in what directions 51, 61, 71, 81 detected vehicles 5, 6, 7, 8 have been driving in each detected lane.

Action 1004

In Action 1004, the suitability determining system 1 determines an autonomous driving suitability indication 11 applicable for the specific road section 4. Correspondingly, the suitability determining unit 104 is adapted or configured for determining an autonomous driving suitability indication 11 applicable for the specific road section 4. The autonomous driving suitability indication 11 indicates that the specific road section 4 is suitable for at least semi-autonomous driving provided that all of the determined summarized direction utilization estimates indicate equally directed utilization and all of the determined summarized confidence values are above respective confidence thresholds. Thus, as shown with support from FIGS. 1 and 2, an indicator 11 is established reflecting appropriateness and/or eligibility of at least semi-autonomous vehicle driving along the specific road section 4. Accordingly, the suitability determining system 1 may determine and further give an indication 11 of whether or not the specific road section 4 is deemed suitable for at least semi-autonomous driving, in being knowledgeable of how detected vehicles 5, 6, 7, 8 have driven 51, 61, 71, 81 along the specific road section 4, such as knowledgeable of whether detected vehicles 5, 6, 7, 8 have been driven equally directed in all detected lanes and/or whether oncoming traffic has been detected in any one of the detected lanes. Subsequently, there is provided a verification 11 of driving utilization of the specific road section 4. Furthermore, thus, as shown with support from FIGS. 1 and 2, the autonomous driving suitability indication 11 only indicates that the specific road section 4 is suitable for autonomous driving in case every aggregated driving direction utilization judgement indicate the same driving direction utilization, i.e. driving in the same direction for all detected lanes, and that the confidence is high enough for all detected lanes.

Optionally, the autonomous driving suitability indication 11 may further indicate that the specific road section 4 is unsuitable for at least semi-autonomous driving when not all of the determined summarized direction utilization estimates indicate equally directed utilization. Thereby, should not the summarized direction utilization estimates for all detected lanes be determined to be equally directed, then the autonomous driving suitability indication 11 would indicate that the specific road section 4 is unsuitable for at least semi-autonomous driving, regardless of whether the determined summarized confidence values are above respective confidence thresholds or not.

Furthermore, optionally, the autonomous driving suitability indication 11 may further indicate that the specific road section 4 is unsuitable for at least semi-autonomous driving when not all of the determined summarized confidence values are above the respective confidence thresholds. Thereby, should a confidence level for a detected lane not be reached, then the autonomous driving suitability indication 11 would indicate that the specific road section 4 is unsuitable for at least semi-autonomous driving, regardless of whether all detected lanes have been determined to be equally directed or not.

Action 1005

In optional Action 1005, the suitability determining system 1 may further provide the autonomous driving suitability indication 11 to at least a first estimate receiving—at least semi-autonomous—vehicle 12 approaching and/or driving along the specific road section 4. Correspondingly, the providing unit 105 may be adapted or configured for providing the autonomous driving suitability indication 11 to at least a first estimate receiving—at least semi-autonomous—vehicle 12 approaching and/or driving along the specific road section 4. Thus, as shown with support from FIGS. 1 and 2, one or more vehicles 12 supporting autonomous operation may be informed 11 of whether or not the specific road section 4 is deemed suitable for at least semi-autonomous vehicle driving. That is, the one or more estimate receiving vehicles 12 may thus be provided a driving utilization verification 11 of the specific road section 4, indicating whether or not the specific road section 4 is deemed a road section comprising equally directed traffic in all lanes or if one or more lanes are deemed comprising oncoming traffic. Thus, with the introduced concept, the one or more estimate receiving vehicles 12 may not need to violate the safety criterion initially discussed.

Additionally or alternatively, optionally, should the suitability determining system 1 be implemented locally on-board a vehicle 12—such as on-board the first estimate receiving vehicle 12—rather than remotely in e.g. the one or more servers and/or automotive clouds, then an activation/deactivation unit (not shown) of the suitability determining system 1 may further be adapted or configured for and/or a method of the suitability determining system 1 may further comprise:

upon entering and/or driving along said specific road section 4:

activating at least semi-autonomous vehicle driving, provided that said autonomous driving suitability indication 11 indicates that said specific road section 4 is suitable for at least semi-autonomous driving; and/or deactivating an ongoing at least semi-autonomous vehicle driving, provided that said autonomous driving suitability indication 11 indicates that said specific road section 4 is unsuitable for at least semi-autonomous driving.

Action 1006

In optional Action 1006, the suitability determining system 1 may further update in digital map data 21, information associated with the specific road section 4 and/or a lane thereof with the autonomous driving suitability indication 11, and/or with at least one of the respective summarized direction utilization estimates and/or one or more of the corresponding respective summarized confidence values. Correspondingly, the updating unit 106 may be adapted or configured for updating in digital map data 21, information associated with the specific road section 4 and/or a lane thereof with the autonomous driving suitability indication 11, and/or with at least one of the respective summarized direction utilization estimates and/or one or more of the corresponding respective summarized confidence values. Thus, as shown with support from FIGS. 1 and 2, data content in digital map data 21 relating to the specific road section 4 and/or a lane thereof may be updated—e.g. continuously or intermittently—with up-to-date information derived from the one or more estimate providing vehicles 3.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method performed by a suitability determining system for establishing whether a road section is suitable for at least semi-autonomous vehicle driving, the suitability determining system being associated with a system supporting communication with one or more vehicles, the method comprising:

identifying a specific road section comprising at least one lane and delimited by at least one lateral road boundary;

deriving from at least a first estimate providing vehicle a respective utilization direction estimate along with a corresponding respective detection confidence value for each of respective lanes detected by the at least first estimate providing vehicle along at least a portion of the specific road section, the respective utilization direction estimate being based on detected driving trajectories detected by the at least first estimate providing vehicle of one or more surrounding vehicles along one or more of the respective detected lanes;

determining a respective summarized direction utilization estimate along with a corresponding respective summarized confidence value for each of the respective detected lanes; and determining an autonomous driving suitability indication applicable for the specific road section, the autonomous driving suitability indication indicating that the specific road section is suitable for at least semi-autonomous driving provided that:

all of the determined summarized direction utilization estimates indicate equally directed utilization, and all of the determined summarized confidence values are above respective confidence thresholds.

2. The method according to claim 1 wherein the autonomous driving suitability indication further indicates that the specific road section is unsuitable for at least semi-autonomous driving when:

not all of the determined summarized direction utilization estimates indicate equally directed utilization.

3. The method according to claim 1 wherein the autonomous driving suitability indication further indicates that the specific road section is unsuitable for at least semi-autonomous driving when:

not all of the determined summarized confidence values are above the respective confidence thresholds.

4. The method according to claim 1 further comprising:

providing the autonomous driving suitability indication to at least a first at lease semi-autonomous estimate receiving vehicle approaching and/or driving along the specific road section.

5. The method according to claim 1 further comprising:

updating, in digital map data, information associated with the specific road section and/or a lane thereof:

with the autonomous driving suitability indication, and/or with at least one of the respective summarized direction utilization estimates and/or one or more of the corresponding respective summarized confidence values.

6. The method according to claim 1 wherein the specific road section is represented by a specific road section along a road intended for one-way traffic, and/or wherein the at least one lateral road boundary is represented by at least one delimiter physically delimiting the specific road section.

7. The method according to claim 1 wherein the respective direction utilization estimate indicates a driving direction of the detected driving trajectories in view of a driving direction of the at least first estimate providing vehicle:

equally directed;

directed in an oncoming direction; and/or both equally directed and in an oncoming direction.

8. A suitability determining system for establishing whether a road section is suitable for at least semi-autonomous vehicle driving, the suitability determining system being associated with a system supporting communication with one or more vehicles, the suitability determining system comprising:

a road section identifying unit configured to identify a specific road section comprising at least one lane and delimited by at least one lateral road boundary;

a deriving unit configured to derive from at least a first estimate providing vehicle a respective utilization direction estimate along with a corresponding respective detection confidence value for each of respective lanes detected by the at least first estimate providing vehicle along at least a portion of the specific road section, the respective utilization direction estimate being based on detected driving trajectories detected by the at least first estimate providing vehicle of one or more surrounding vehicles along one or more of the respective detected lanes;

a summary determining unit configured to determine a respective summarized direction utilization estimate along with a corresponding respective summarized confidence value for each of the respective detected lanes; and a suitability determining unit configured to determine an autonomous driving suitability indication applicable for the specific road section, the autonomous driving suitability indication indicating that the specific road section is suitable for at least semi-autonomous driving provided that:
  all of the determined summarized direction utilization estimates indicate equally directed utilization, and
  all of the determined summarized confidence values are above respective confidence thresholds.

9. The suitability determining system according to claim 8 wherein the autonomous driving suitability indication further indicates that the specific road section is unsuitable for at least semi-autonomous driving when:
  not all of the determined summarized direction utilization estimates indicate equally directed utilization.

10. The suitability determining system according to claim 8 wherein the autonomous driving suitability indication further indicates that the specific road section is unsuitable for at least semi-autonomous driving when:
  not all of the determined summarized confidence values are above the respective confidence thresholds.

11. The suitability determining system according to claim 8 further comprising:
  a providing unit configured to provide the autonomous driving suitability indication to at least a first at least semi-autonomous estimate receiving vehicle approaching and/or driving along the specific road section.

12. The suitability determining system according to claim 8 further comprising:
  an updating unit configured to update, in digital map data, information associated with the specific road section and/or a lane thereof:
    with the autonomous driving suitability indication, and/or
    with at least one of the respective summarized direction utilization estimates and/or one or more of the corresponding respective summarized confidence values.

13. The suitability determining system according to claims 8 wherein the specific road section is represented by a specific road section along a road intended for one-way traffic, and/or wherein the at least one lateral road boundary is represented by at least one delimiter physically delimiting the specific road section.

14. The suitability determining system according to claim 8 wherein the respective direction utilization estimate indicates a driving direction of the detected driving trajectories in view of a driving direction of the at least first estimate providing vehicle:
  equally directed;
  directed in an oncoming direction; and/or
  both equally directed and in an oncoming direction.

15. A non-transitory computer readable medium having stored computer executable instructions which, when executed in a suitability determining system for establishing whether a road section is suitable for at least semi-autonomous vehicle driving, the suitability determining system being associated with a system supporting communication with one or more vehicles, cause the system to:
  identify a specific road section comprising at least one lane and delimited by at least one lateral road boundary;
  derive from at least a first estimate providing vehicle a respective utilization direction estimate along with a corresponding respective detection confidence value for each of respective lanes detected by the at least first estimate providing vehicle along at least a portion of the specific road section, the respective utilization direction estimate being based on detected driving trajectories detected by the at least first estimate providing vehicle of one or more surrounding vehicles along one or more of the respective detected lanes;
  determine a respective summarized direction utilization estimate along with a corresponding respective summarized confidence value for each of the respective detected lanes; and
  determine an autonomous driving suitability indication applicable for the specific road section, the autonomous driving suitability indication indicating that the specific road section is suitable for at least semi-autonomous driving provided that:
    all of the determined summarized direction utilization estimates indicate equally directed utilization, and
    all of the determined summarized confidence values are above respective confidence thresholds.

* * * * *

UNITED STATES PATENT AND TRADEMARK OFFICE
CERTIFICATE OF CORRECTION

PATENT NO. : 10,297,145 B2  
APPLICATION NO. : 15/672609  
DATED : May 21, 2019  
INVENTOR(S) : Sebastian Thelen et al.

Page 1 of 1

It is certified that error appears in the above-identified patent and that said Letters Patent is hereby corrected as shown below:

In the Claims

Column 22, Line 6, Claim 13:
After "The suitability determining system according to"
Delete "claims" and
Insert -- claim --.

Signed and Sealed this
Fifteenth Day of October, 2019

Andrei Iancu
*Director of the United States Patent and Trademark Office*